US006181983B1

(12) United States Patent
Schlemmer et al.

(10) Patent No.: US 6,181,983 B1
(45) Date of Patent: Jan. 30, 2001

(54) METHOD OF COMMAND CONTROL FOR A ROBOT MANIPULATOR

(75) Inventors: Maximilian Schlemmer, Seeshaupt; Manfred Schedl, Pfaffenhofen; Michael Steinmetz, Wessling; Georg Grübel, Weilheim; Reinhard Finsterwalder, Pucheim, all of (DE)

(73) Assignee: Deutsches Zentrum für Luft-und Raumfahrt e.v., Bonn (DE)

(*) Notice: Under 35 U.S.C. 154(b), the term of this patent shall be extended for 0 days.

(21) Appl. No.: 09/100,014

(22) Filed: Jun. 19, 1998

(30) Foreign Application Priority Data

Jun. 20, 1997 (DE) .................................. 197 26 166
Jan. 11, 1998 (DE) .................................. 198 00 552

(51) Int. Cl.[7] .................................................. G06F 19/00
(52) U.S. Cl. .................. 700/245; 700/250; 700/251; 700/262; 700/263; 700/244; 318/568.11; 318/568.12; 318/646; 318/628; 318/648; 900/9; 900/15; 395/80; 395/81; 395/82; 395/83; 395/96; 395/98; 708/442; 708/625
(58) Field of Search ................................. 700/245, 262, 700/263, 250, 251, 244; 318/568.111, 568.24, 646, 628, 648; 900/9, 15; 395/80–98; 708/442, 625

(56) References Cited

U.S. PATENT DOCUMENTS

| 4,589,810 | | 5/1986 | Heindl et al. . | |
|---|---|---|---|---|
| 4,593,366 | * | 6/1986 | Sugimoto et al. | 395/97 |
| 4,999,553 | * | 3/1991 | Seraji | 395/80 |
| 5,179,514 | * | 1/1993 | Rastegar et al. | 364/167.01 |
| 5,214,749 | * | 5/1993 | Brown | 395/95 |
| 5,276,390 | * | 1/1994 | Fisher et al. | 318/568.1 |
| 5,293,461 | * | 3/1994 | Grudic et al. | 395/97 |
| 5,430,643 | * | 7/1995 | Seraji | 364/167.01 |
| 5,737,500 | * | 4/1998 | Seraji et al. . | |

FOREIGN PATENT DOCUMENTS 33 44 633    6/1984  (DE) .

* cited by examiner

Primary Examiner—Ayaz R. Sheikh
Assistant Examiner—Firmin Backer
(74) Attorney, Agent, or Firm—Browdy And Neimark

(57) ABSTRACT

Beginning with a successive commanded end-effector destination shift, the method of the invention, which includes a calculation corresponding to a special algorithm of inverse kinematics using the Jacobi Matrix in the control of a manipulator, effects an optimization of weighted criteria (energy criteria, acceleration criteria and reference-position criteria) in a real-time cycle while reliably maintaining all path limitations and resulting in an optimized acceleration behavior. The method of the invention can be used in interactive path guidance of a manipulator and/or as a modular component of a superordinate task, such as for force-control objectives.

16 Claims, 2 Drawing Sheets

METHOD OF COMMAND CONTROL FOR A ROBOT MANIPULATOR

FIELD OF THE INVENTION

The present invention relates to a method of command control for a manipulator, based on end-effector destination shifts ($\Delta x_d$) commanded by a programmer or a superordinate task with the aid of a manual control ball or the like, in combination with a calculation of articulation position values according to an algorithm of inverse kinematics.

REVIEW OF THE RELATED TECHNOLOGY

Methods of command control of a manipulator based on end-effector destination shifts, in combination with a calculation according to an algorithm of inverse kinematics using the Jacobi Matrix, are known from Siciliano, B., Sciavicco, L.: "Modeling and Control of Robot Manipulators," McGraw-Hill Companies (1996), pp 95 to 101, and from Vukobratovic, M., Kircanski, N.: "Kinematics and Trajectory Synthesis of Manipulation Robots," Springer-Verlag, Tokyo, 1986, pp 105 to 122.

In this context, a method of inverse kinematics is obtained for kinematically non-redundant manipulators, albeit in a partial space of the working area that contains non-singular positions. Since singular configurations, i.e., articulator positions in which the Jacobi Matrix experiences a reduction in priority, do occur in practice, this method has only limited application, because the operation being performed with the manipulator (interactive path guidance, force control) must be aborted or delayed when a singular configuration (singularity) is approached.

In this context, a method is known that includes a calculation of a generalized inverse of the Jacobi Matrix. This method possesses a few advantageous properties, but is also associated with a number of disadvantages. For example, a smoothness of the calculated articulation path and low wear of the robot drive are attained through minimization of the local articulation position offset $\Delta q$ (local energy criteria). In addition, the spacing between the articulation positions and the physical articulation stops is taken into consideration through the optimization of global criteria in the zero space of the Jacobi Matrix. Disadvantages of this method are that it cannot guarantee that path limitations will be maintained with physical articulation stops, and unstable behavior occurs in singular robot positions due to a (generalized) inversion of the Jacobi Matrix, and inefficient robot path courses are possible when conflicting local and global criteria exist.

In another known method, in which a calculation of the transposed Jacobi Matrix is performed, the commanded end-effector destination is attained iteratively corresponding to a representation of reverse kinematics as an optimization problem. An advantageous feature of this method is a stable behavior in singular robot positions, because the Jacobi Matrix is not inverted.

However, there is no guarantee that path limitations can be maintained through physical articulation stops and maximum articulation speeds. Superordinate heuristics must be constructed to meet these requirements, which then results in errors in the real end effector position compared to the desired end effector position. Inefficient path courses result in the form of interference movements of the end effectors, because the Cartesian linear movement commanded by the manual control ball cannot be transferred exactly to the end effector of the manipulator.

Moreover, the robot drive is subjected to high material wear due to abrupt passage through singular robot positions and because of a generally insufficiently smooth articulation path, since neither the weighted local articulation position offset nor the local articulation speed offset (local energy and acceleration criteria) have been optimized. A further negative consequence is a low convergence speed, i.e., a reduced ability to operate in real time, because no practical optimum strategy is known for determining the positively-defined Cartesian stiffness matrix.

DE 33 44 633 C2 describes a real-time control in which the redundant articulations that are not necessary for the movement of an end effector are noted for calculating the articulation speed, which simplifies the calculation of the inverse Jacobi Matrix. This type of calculation is performed for at least one of the articulation combinations. The speeds for each articulation are then determined through averaging of the calculated articulation speeds. A weighting of the articulation speeds thus takes place in this prior art.

U.S. Pat. No. 5,430,643 also describes a real-time method, in which the inverse Jacobi Matrix is calculated. The method known from this U.S. patent document also takes into consideration weight values for the articulation speeds, as well as path limitations for at least a graphic simulation of the robot's movements.

The German patent application 197 03 915.4 and U.S. application Ser. No. 08/017,485 propose a method in which an interactive path guidance of a kinematically redundant manipulator can be performed efficiently, with the advantage of an accordingly less complex and thus more user-friendly parametrization. The only disadvantage of this method is that it is not suitable for force control purposes since no uniform measurement exists to indicate which percentage of the desired end-effector destination shift can be attained; also, the method places a lower priority on attaining the best possible end-effector destination shift.

SUMMARY OF THE INVENTION

It is an object of the invention to provide a method of inverse kinematics command control for an interactive path guidance, and/or as a modular component of a superordinate task (e.g., force control) of a manipulator with an optimized acceleration behavior, with which path limitations can be reliably maintained through physical articulation stops and maximum allowable articulation speeds to ensure the accuracy of the determined solution with respect to the allowable path limitations, and with which the stress on the manipulator drive device is kept to a minimum by optimizing the acceleration behavior of the articulation axes.

In accordance with the invention, which relates to a method of command control for a manipulator of the above type, this object is accomplished in that a new articulation position ($q_{i+1}$) of the manipulator is calculated, beginning with a commanded end-effector destination shift and the current actual value ($q_i$) of the articulation position of the manipulator, with consideration of a quality function (f(q)) to be minimized, which is parametrized by non-negative weighting values ($a\alpha_j$, $\beta_j$, $\gamma_j$), and with consideration of path limitations through physical articulation stops ($q_{min}$, $q_{max}$), maximum articulation speed ($\dot{q}max$), maximum articulation acceleration ($\ddot{q}max$) in an environment of physical articulation stops, and the kinematic equation, which is represented by the Jacobi Matrix (J (q)), which articulation position predetermines the new values for the articulation regulators, with the quality function (f(q)) being the sum of energy criterion, reference-position criterion, acceleration criterion and an additional criterion, the energy criterion being calculated from $$(q-q_i)^t \text{diag}(a_j)(q-q_i)$$

the reference-position criterion being calculated from $$(q-q_{ref})^t \text{diag}(\beta_j)(q-q_{ref}),$$

the value $q_{ref}$ being a predetermined articulation position value that is determined such that the sequence of calculated articulation position values ($q_i$) runs near this reference position value;

the acceleration criterion being calculated from $$(q-2q_{i-1})^t \text{diag}(\gamma_j)(q-2q_i+q_{i-1}),$$

and the additional criterion from $-p$, with the scalar parameter p satisfying the kinematic equation $p \cdot \Delta x_d = J(q_i(q-q_i))$ and the inequality $0 \leq p \leq 1$; $p \cdot 100$ being the attained percentage of the commanded end-effector destination shift ($\Delta x_d$), beginning with an articulation-position value $q_i$ as the starting point, an allowable optimization vector is determined on the basis of the quality function with respect to all active secondary conditions that indicate which path limitations have been attained, and this vector is scaled according to the inactive secondary conditions that indicate which path limitations have not been attained;

the scaled optimization vector is added to the articulation position value calculated in the previous iteration step;

and the optimum quality of these articulation-position values is evaluated based on the quality function and the secondary conditions activated in the newly-calculated articulation position.

The method according to the invention may be used in the interactive path guidance of the manipulator based on end-effector destination shifts commanded by an operator with the aid of a manual control ball (space mouse) or the like.

The method according to the invention may, however, also be used as a modular component of a superordinate task, with end-effector destination shifts commanded by the superordinate task. A superordinate task may, for instance, be one of the type posed by force-control objectives.

The method of the invention results in low wear of the manipulator drive through minimization of the local articulation-position offset $\Delta q$ and the local articulation-speed offset (energy criteria and acceleration criteria). "Narrow" articulation paths around a reference position (e.g., zero position) are attained, resulting in a reversible behavior of the manipulator movement.

This specifically serves to prevent the manipulator roller axes from twisting increasingly during the performance of the commanded manipulation until they come to rest against the end stop, rendering a continued performance of the manipulation task impossible.

Articulation stops are advantageously mostly avoided or approached gently or with low wear. This behavior is caused by a delay effect of the robot axes, which acts proportionally to the distance from the reference position, and by explicit acceleration limitations. In addition, a stable behavior results for singular robot positions, because the Jacobi Matrix is not inverted.

Another advantage is the occurrence of efficient path courses through the exact transfer of the Cartesian linear movement commanded by the manual control ball to the end effector of the manipulator. In addition, path limitations are reliably maintained through physical articulation stops and maximum articulation speeds.

Since this results in a restriction of the number of solutions, i.e., in a limited number of allowable articulation positions, a high convergence speed is attained with a gain in real-time operability. In addition, the attained percentage of the desired end-effector destination shift is calculated. Singularities can be approached in a stable manner and/or passed through; as a result it also is not necessary to limit the working space.

A Cartesian end-effector destination shift $\Delta_c$, commanded at a time $T_i$ can be commanded by the operator and/or by a superordinate task (e.g., force control) in the form of a 6-dimensional increment vector. Alternately, the increment vector may also be determined by evaluating the difference between absolute end-effector coordinates.

BRIEF DESCRIPTION OF THE DRAWING FIGURES

DETAILED DESCRIPTION OF THE PREFERRED EMBODIMENT

The present invention is a method for transforming the input commands to a robot (or "manipulator"), preferably via Jacobian matrix methods. The invention also contemplates an apparatus for transforming the input commands, which may be interposed between an actuator and the robot. The actuator may any sort, e.g. a mouse or joystick, a recorder with a recorded sequence of commands to be output to the calculating unit, a second programmed computer, and so on.

The apparatus, which acts as a calculating unit, in most cases will be a microprocessor, computer, etc., but may be an analogue computer or other device which can carry out the method of the invention. The present invention also includes a combination of actuator, calculating unit, and robot.

Figure 1:
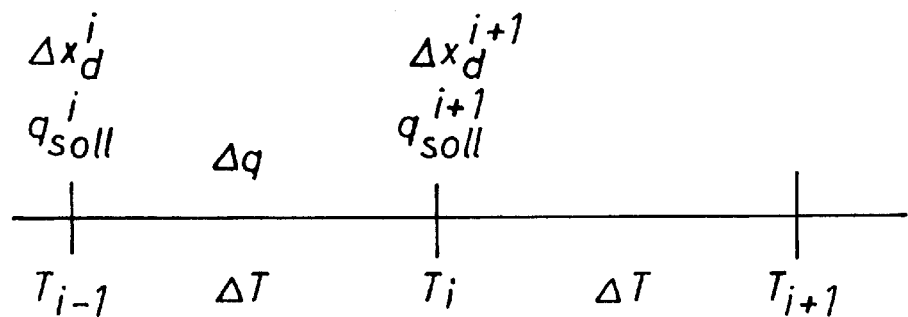
FIG. 1 is a schematicized illustration of an input/output flux of reverse kinematics in the real time grid.

FIG. 1 is a time graph showing the notation used for the inputs and outputs to the calculating unit of the present invention. The horizontal axis represents time. Calculation inputs are generically denoted x and results or outputs corresponding to robotic position are generically denoted q, with superscripts showing the corresponding instant of time. FIG. 1 shows that the calculations are preferably not continuous but incremental. The method calculates over the time interval a next $q^{i+1}$ from the preceding $q^i$.

A robot's manipulator will ordinarily have six degrees of freedom in space (three of translation and three of rotation). According to the particular geometry of the robot's limbs, rotators, etc., there will be several different sets of actuators and sensors associated with respective dimensions. The notation of FIG. 1 represents only one of several dimension, i.e. angles or directions, in which the manipulator can move.

It is to be noted that motion in any one of the six directions is likely to cause motion in at least one of the others, and these motions are interrelated according to the geometry of the robot. For example, an angular changes at a "elbow" will cause a "hand" to translate through an arc. If the input device or instruction set has a different geometry from the robot—for example, the input device has three levers for three directions in space but the robot has a single extendable arm—then the end-effect destination shift commands will need to be converted into manipulator articulation positions by the use of matrix methods. Thus matrix methods must be used in the present equation.

Figure 2:
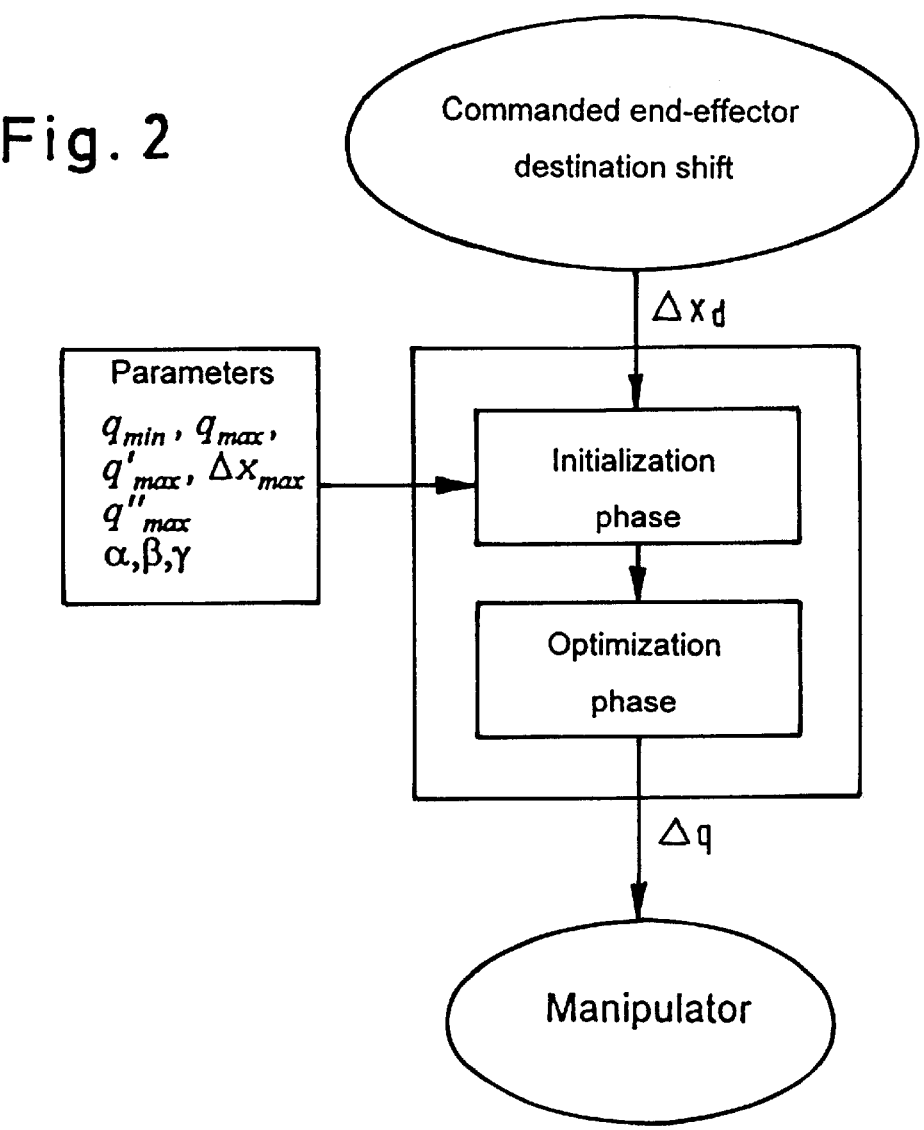
FIG. 2 shows, in the form of a block diagram, an algorithm of inverse kinematics used in the method of command control of a manipulator according to the invention.

FIG. 2 is a flowchart schematically illustrating the method of the invention. Aside from the input from the actuator, i.e. $\Delta x_d$, the calculation process also takes into account parameters shown in the box at left.

One of these parameters is a limit on the input, $\Delta x_{max}$, which cuts off large commands, i.e. in case of a sudden joystick lurch or the like.

Figure 3:
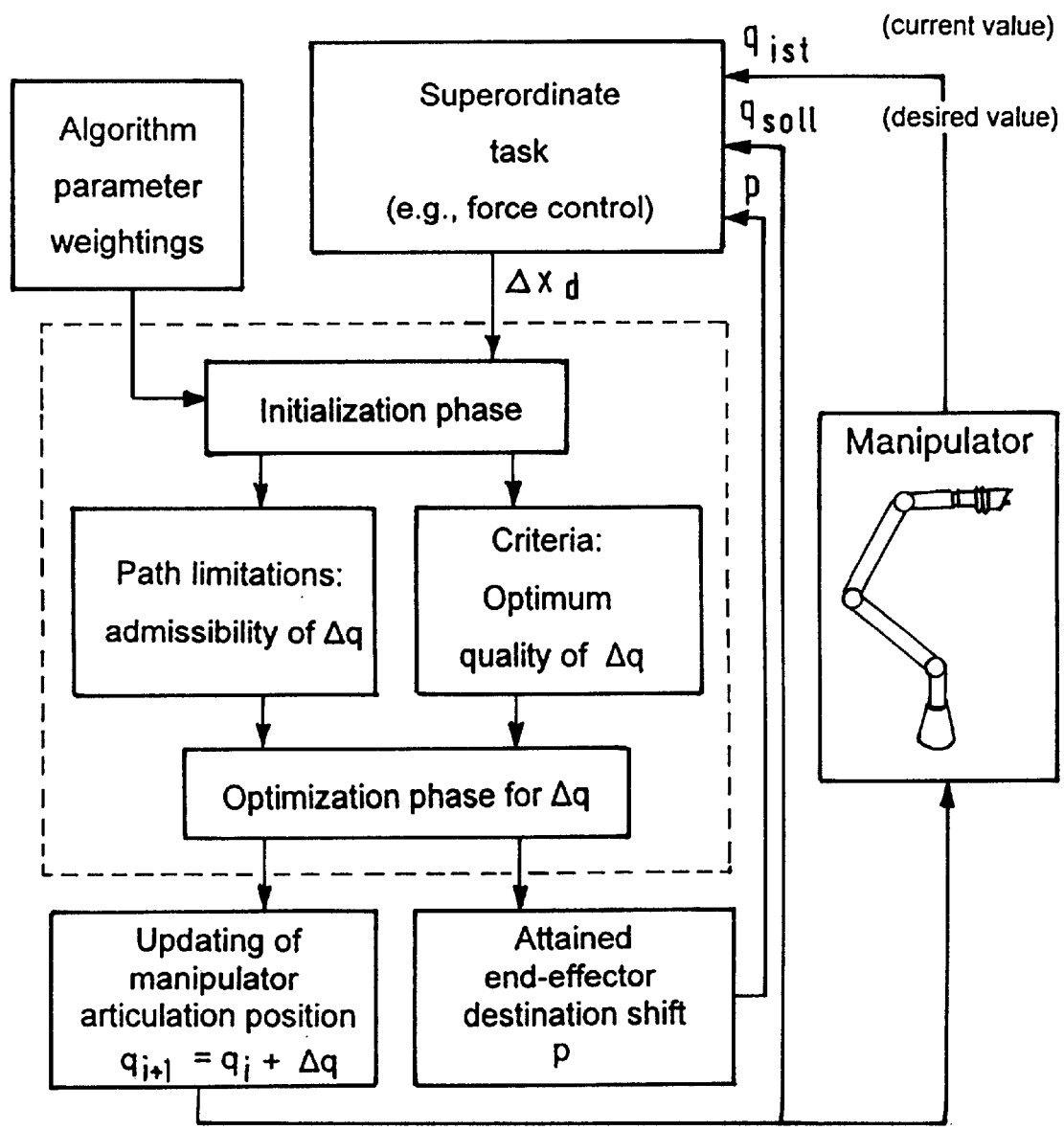
FIG. 3 shows the application of the method of the invention for the command control of a manipulator within the frame of the performance of a superordinate task, such as a force control.

Other parameters limit the motion of the robot: displacement or angle limits are denoted by $q_{min}$ and $q_{max}$, and maximum robot change rates and acceleration $\dot{q}_{max}$ and $\ddot{q}_{max}$. In FIG. 3 these are shown as "Path limitations".

Still other parameters $\alpha$, $\beta$, and $\gamma$ are described as "algorithm parameter weightings" in FIG. 3. These weighting values are preferably non-negative, and are used to minimize a "quality function" f(q). The quality function incorporates criteria based on energy, reference position, acceleration, and a scalar parameter p.

In the method according to the invention, a commanded end-effector destination shift $\Delta x_c := (\Delta x_t, \Delta x_r)$ is specified with the use of the Jacobi Matrix of kinematics at a time $T_i$, said end-effector destination shift being commanded by the operator with the aid of a space mouse or control ball in the form of a 6-dimensional increment vector. $\Delta x_t \in \Re^3$ or $\Delta x_r \in \Re^3$ always denote the translational or rotational portion of the commanded end-effector destination shift, whereas $\Delta x_t^{max}$ or $\Delta x_r^{max}$, respectively, each define the maximum (scalar-value) translational or rotational Cartesian position offset of the end effector per sampling time $\Delta T$.

The desired Cartesian translational or rotational end-effector destination shift $\Delta x_t^d$ or $\Delta x_r^d$ per sampling time $\Delta T$ is defined as follows:

$$\Delta x_t^d := \begin{cases} \Delta x_t & \text{if}|\Delta x_t| \leq \Delta x_t^{max} \\ \Delta x_t \frac{|\Delta x_t|}{\Delta x_t^{max}} & \text{otherwise} \end{cases}$$

$$\Delta x_r^d := \begin{cases} \Delta x_r & \text{if}|\Delta x_r| \leq \Delta x_r^{max} \\ \Delta x_r \frac{|\Delta x_r|}{\Delta x_r^{max}} & \text{otherwise} \end{cases}$$

The value $|x|$ of a vector x is determined here and hereinafter by its Euclidian norm $$|x| := \sqrt{\left(\sum_i x_i^2\right)},$$

The desired end-effector destination shift is explained by $\Delta x_d := (\Delta x_t^d, \Delta x_r^d)$. The energy criteria, reference-position criteria and acceleration criteria can be suitably weighted according to the prevalent problem-specific requirements by allocating three positive numerical values $\alpha_j$, $\beta_j$, $\gamma_j$ to each axis j, which are predetermined by the operator, the value $\alpha_j$ serving in the weighting of an energy criterion that evaluates the difference between two adjacent, calculated articulation positions of axis j; and the value $\beta_j$ serving in the weighting of a criterion that evaluates the deflection of the articulation position $q_j$ from a reference value $q_{ref,j}$, which is also predetermined by the operator, and the value $\gamma_j$ serving in the weighting of a criterion which evaluates the acceleration behavior in the form of an articulation speed offset of the articulation axis $q_j$. The articulation speed offset of the articulation axis $q_j$ is predetermined by the operator, just like the physical articulation stops $q_{min}$, $q_{max}$ of the manipulator, which relate to path limitations, and the articulation speed limitations $\dot{q}_{max}$ and the articulation acceleration limitations $\ddot{q}_{max}$. Since the method according to the invention is intended to optimize weighted criteria in the real-time cycle while guaranteeing that all path limitations are maintained, an allowable optimum articulation position offset $\Delta q^i$ is calculated for a desired end-effector destination shift $\Delta x_d^i$ at the time $T_{i-1}$ during the time interval $\Delta T$, with the algorithm of inverse kinematics that progresses during an initialization phase and a subsequent optimization phase. The current desired value is provided to the articulation regulators from $q_{soll}^{i+1} := q_{soll}^i + \Delta q^i$, with the articulation positions being shifted accordingly by the articulation regulators with $q_{soll}^i$ during the time period $\Delta T$. Allowable articulation position offset is understood to mean that the articulation position value that has been updated with $\Delta q$ satisfies the physical articulation stops $q_{min}$, $q_{max}$ corresponding to $q_{min} \leq q_{soll} + \Delta q_{max}$, and $\Delta q$ satisfies the articulation speed limitations $\dot{q}_{max}$ corresponding to $|\Delta q^i| \leq \dot{q}_{max} \Delta T$. As a result, the limitations of the articulation accelerations are maintained reliably during the approach of articulation positions to the physical articulation stops. The type of optimum quality of $\Delta q^i$ can be determined by the operator through the quality-criterion weighting $\alpha$, $\beta$, $\gamma$. As a result, the sampling time $\Delta T$ corresponding to $\Delta T \geq \max (\Delta t_q, \Delta t_r)$ is dimensioned such that the computation time $\Delta t_q$ for calculating an optimum allowable articulation position offset $\Delta q$ and the adjustment time $\Delta t_r$, which the regulators require for adapting the axial positions to the desired values $q_{soll}$, lie within the time span $\Delta T$.

An algorithmic description of the method of the invention follows.

$J_i$, i=1, . . . , ndof denote the columns of the Jacobi Matrix of kinematics in the point $q_i$ of the current articulation position of the manipulator, ndof denotes the number of articulations and $\epsilon_i := \dot{q}_{max}^i \Delta T$ denotes the maximum allowed articulation position offset per sampling time $\Delta T$. With $$y_i := \frac{\Delta q^i}{\epsilon_i}$$

and $J_\epsilon := (J_1 \epsilon_1, J_2 \epsilon_2, \ldots, J_{ndof} \epsilon_{ndof})$, the incremental kinematic equation is as follows:

$$p\Delta x_d = J_\epsilon y. \tag{1}$$

Because of the path limitations, the following box limitations result for y:

$$y_{\min}^i := \max\left(-\frac{bnd_{Low}^i}{\varepsilon_i}, \frac{q_{\min}^i - q_{soll}^i}{\varepsilon_i}\right)$$

$$y_{\max}^i := \min\left(-\frac{bnd_{Up}^i}{\varepsilon_i}, \frac{q_{\max}^i - q_{soll}^i}{\varepsilon_i}\right),$$

$$bnd_{Low}^i := \min\left(\varepsilon_i, \frac{|q_{\min}^i - q_{soll}^i||\ddot{q}_{\max}^i|\Delta T^2}{\varepsilon_i}\right)$$

$$bnd_{Up}^i := \min\left(\varepsilon_i, \frac{|q_{\max}^i - q_{soll}^i||\ddot{q}_{\max}^i|\Delta T^2}{\varepsilon_i}\right).$$

Further define:

$$y_{ref}^i := \frac{q_{ref}^i - q_{soll}^i}{\varepsilon_i}, \quad y_{acc}^i := \frac{\Delta \bar{q}^i}{\varepsilon_i},$$

with $\Delta \bar{q}^i$ denoting the recently calculated increment of the i-th articulation axis.

So that all path limitations can be met, according to the kinematic equation (1), the desired end-effector destination shift is subjected to a centric extension described in the form of a scalar:

$$0 \leq p \leq 1.$$

The value p is maximized with the method of the invention such that all path limitations are maintained, with p·100 being the attained percentage of the desired end-effector destination shift.

Define the limitation vector b:=0, 0, 0, 0, 0, 0, $y_{min}$, 0,$-y_{max}$, $-1) \in \Re^{2n+6}$, the parameter vector x: =(y,p) to be determined and the matrix of the gradients of all secondary conditions $A \in \Re^{2n+6,n}$ with n: =ndof+1:

$$A := \begin{pmatrix} J_\varepsilon, & -\Delta x_d \\ I_n & \\ -I_n & \end{pmatrix} \quad (2)$$

Here $I_n \in \Re^{n,n}$ indicates the unit matrix. Furthermore, $\alpha_i$, i=1, . . . , 2n+6 indicate the lines of A.

The weights $\alpha$, $\beta$, $\gamma$ of the criteria define the Cholesky factor of the Hesse matrix from the scaled sum of the criteria in the form of the diagonal matrix $\Lambda \in \Re^{n,n}$. These criteria are the energy criterion $(q-q_i)^t \text{diag}(\alpha_j) (q-q_i)$, the reference-position criterion $(q-q_{ref})^t \text{diag}(\beta_j) (q-q_{ref})$, with the value $q_{ref}$ being a predetermined articulation position value which is determined such that the sequence of the calculated articulation position values $(q_i)$ runs near this reference position value; the acceleration criterion $(q-2q_i+q_{i-1})^t \text{diag}(\gamma_j) (q-2q_i+q_{i-1})$ and the additional criterion from $-p$, whereby the scalar parameter p satisfies the kinematic equation $p\Delta x_d = J(q_i)(q-q_i)$ and the inequality $0 \leq p \leq 1$; p·100 being the attained percentage of the commanded end-effector destination shift ($\Delta x_d$). The main diagonal elements of the above-mentioned diagonal matrix are:

$$\Lambda_{i,i} := \sqrt{2(\alpha_i^{scal} + \beta_i^{scal} + \gamma_i^{scal})} \quad \text{for } 1 \leq i \leq n-1$$

and $$\Lambda_{n,n} := 0$$

with $$\alpha_i^{scal} := \alpha_i \frac{1}{ndof},$$

$$\beta_i^{scal} := \beta_i \frac{\varepsilon_i}{ndof(q_{\max}^i - q_{\min}^i)},$$

$$\gamma_i^{scal} := \gamma_i \frac{1}{3ndof}.$$

The base structure of the special method according to the invention, which utilizes an inverse kinematics for command control, is illustrated schematically in FIG. 2

An algorithm used in the method of the invention for the inverse kinematics is described in more detail below, in conjunction with FIG. 2. In the used algorithm of inverse kinematics, first an initialization phase is performed, which is configured as follows: Counting index: k=0; Starting value $x_k=(y_k, p_k)=0$; k max>2; Initialize with $m_k$: =7 the matrix of the gradients of the active secondary conditions $\hat{A}^t \in \Re^{m_k,n}$:

$$\hat{A}^t := \begin{pmatrix} J_\varepsilon, & -\Delta x_d \\ 0, & 1 \end{pmatrix};$$

initialize the index quantity $J_k$: =($j_k^1$, $j_k^2$, . . . , $j_k^{2n+6}$) to characterize the active, singular and inactive secondary conditions:

$$j_k^i := \begin{cases} n+6 & \text{for } i = 7 \\ i-1 & \text{for } i = 8, \ldots, n+6 \\ i & \text{otherwise;} \end{cases}$$

initialize the orthogonal triangular factorization of $\hat{A}$:

$(r_k, J_k, Y_k, Z_k, L_k, S_k) := \Phi_0^A(\hat{A}, m_k, J_k);$ initialize the orthogonal regular triangular factorization of $\bar{Z} := \Lambda Z_k$:

$(Q_k^z, R_k^z) := \Phi_0^z(\bar{Z} r_k):$ initialize the gradient vector of the quality function f(q)

$$g_0 \in \mathcal{T} R^n : g_k := 2(\beta_1^{scal}(y_k^1 - y_{ref}^1) + \gamma_1^{scal}(y_k^1 - y_{acc}^1) +$$
$$\alpha_1^{scal} y_k^1, \ldots, \beta_{ndof}^{scal}(y_k^{ndof} - y_{ref}^{ndof}) +$$
$$\gamma_{ndof}^{scal}(y_k^{ndof} - y_{acc}^{ndof}) + \alpha_{ndof}^{scal} y_k^{ndof}, -1),$$

The following abbreviated form is used for $g_k$:

$$2(\beta_i^{scal}(y_k^i - y_{ref}^i) + \gamma_i^{scal}(y_k^i - y_{acc}^i) + \alpha_i^{scal} y_k^i, -1),$$

In the used algorithm of inverse kinematics, an optimization phase is next, which is constructed as follows:

Calculate the direction of optimization $d_k$:

$R_k^z d_{aux} = -Q_k^z Z_k g_k.$

From this, determine $d_{aux}$ through reverse substitution.

$R_k^z d_z = Q_k^z d_{aux}.$

From this, determine $d_z$ through reverse substitution. Define the direction of optimization:

$d_k := Z_k d_z.$

Determine the maximum step width $s_k$ and the index $j_k^{i0}$ of the limiting secondary condition:

$$s_k := \begin{cases} \min_j \begin{cases} \frac{b_j - a_j^t x_k}{a_j^t d_k} \text{ with } a_j^t d_k < 0 \\ \text{and } \forall i > m_k \text{ with } j = j_k^i \end{cases} =: \frac{b_{j0} - a_{j0}^t x_k}{a_{j0}^t d_k} \text{ with } j_k^0 := j0; \\ 1 \quad \text{if } a_j^t d_k \geq 0, \forall i > m_k \text{ with } j = j_k^i \end{cases}$$

(In the event of ambiguity, select the j0 having the smallest index i0).

III. Check for optimum quality and update all matrix and index values.

(a) If $s_k<1$ (secondary condition $j_k^0$ has become active):

i. If $m_k<n$ (there are still inactive secondary conditions):
$x_{k+1}=x_k+s_k d_k$, $x_{k+1}=(Y_{k+1}, P_{k+1})$; $g_{k+1}=2(\beta_i^{scal}(y_{k+1}^i - y_{ref}^i)+\gamma_i^{scal}(y_{k+1}^i - y_{acc}^i)+\alpha_i^{scal} y_{k+1}^i - 1)$.

Update matrix factorization and index quantity: $(r_{k+1}, m_{k+1}, J_{k+1}, Y_{k+1}, Z_{k+1}, L_{k+1}, S_{k+1}):=\Phi_-^A(i0, r_k, m_k, J_k, Y_k, Z_k, L_k, S_k)$.

Check $x_{k+1}$, for optimum quality:
If $Z_{k+1}^t g_{k+1}=0$ and $\lambda_{k+1}=LLS(r_{k+1}, m_{k+1}, g_{k+1}, Y_{k+1}, L_{k+1}) \geq 0$ then: go to step IV.

Otherwise: k=k+1 (increase iteration index)
If k>k max: go to step IV.
Otherwise: Determine the orthogonal, regular triangular factorization of
$\bar{Z}:=\Lambda Z_{k+1}$:
$(Q_{k+1}^z, R_{k+1}^z):=\Phi^z(\bar{Z}, r_{k+1})$
Go to Step I.

ii. If $m_k=n$ (corner of allowable range is attained, exchange of active secondary conditions is necessary):

$x_{k+1} = x_k + s_k d_k$, $x_{k+1} = (Y_{k+1}, P_{k+1})$;
$g_{k+1} = 2(\beta_i^{scal}(y_{k+1}^j - y_{ref}^j) + \gamma_i^{scal}(y_{k+1}^j - y_{acc}^j) + \alpha_i^{scal} y_{k+1}^j - 1)$
$\lambda_k = LLS(r_{k+1} m_{k+1}, g_k, Y_k, L_k)$.

Release a direction having the highest optimization potential:

$\lambda_k^{j0} := \min_j \lambda_k^j;$

Update matrix factorizations and index quantity:
$\tilde{r}_k, \tilde{m}_k, \tilde{J}_k, \tilde{Y}_k, \tilde{Z}_k, \tilde{L}_k, \tilde{S}_k) = \Phi_-^A(j0, r_k, m_k, J_k, Y_k, Z_k, L_k, L_k, S_k)$
Activate secondary condition $j_k^{i0}$.
Update matrix factorizations and index quantity:
$(r_{k-1}, m_{mk+1}, J_{k+1}, Y_{k+1}, Z_{k+1}, L_{k+1}, S_{k+1}):=\Phi_+^A(i0, \tilde{r}_k, \tilde{m}_k, \tilde{J}_k, \tilde{Y}_k, \tilde{Z}_k, \tilde{L}_k, \tilde{S}_k)$.
Examine $x_{k+1}$ for optimum quality:
If $Z_{k+1}^t g_{k+1}=0$; and $\lambda_{k+1}=LLS(r_{k+1}, m_{k+1}, g_{k+1}, Y_{l+1}, L_{k+1}) \geq 0$
then: go to step IV.
Otherwise: k=k+1 (increase iteration index)
If k>k max: go to step IV.
Otherwise: Determine the orthogonal, regular triangular factorization of
$\bar{Z}:=\Lambda Z_{k-1}$: $(Q_{k+1}^z, R_{k+1}^z):=\Phi^z(\bar{Z}, r_{k+1})$.
Go to Step I.
If $s_k=1$ (no new active secondary condition).
$x_{k+1}=x_k+d_k$, $x_{k+1}=(Y_{k+1}, P_{k+1})$;
$g_{k+1}=2(\beta_i^{scal}(y_{k+1}^i - y_{ref}^i)+\gamma_i^{scal}(y_{k+1}^i - y_{acc}^i)+\alpha_i^{scal} y_{k+1}^i - 1)$;

Update matrix factorizations and index quantity:
$(r_{k+1}, m_{k+1}, J_{k+1}, Y_{k+1}, Z_{k+1}, L_{k+1}, S_{k+1}):=(r_k, m_k, J_k, Y_k, Z_k, L_k, S_k)$.
Check $x_{k+1}$ for optimum quality:
If $Z_{k+1}^t g_{k+1}=0$;
and $\lambda_{k+1}=LLS(r_{k+1}, m_{k+1}, g_{k+1}, Y_{k+1}, L_{k+1}) \geq 0$
then: go to step IV.
Otherwise: Release a direction having the highest optimization potential:

$\lambda_k^{j0} :=_j^{min} \lambda_k^j;$

Update matrix factorizations and index quantity:
$(r_{k+1}, m_{k+1}, J_{k+1}, Y_{k+1}, Z_{k+1}, L_{k+1}, S_{k+1}):=\Phi_-^A(j0, r_k, m_k, J_k, Y_k, Z_k, L_k, S_k)$
−k=k+1 (increased iteration index)
If k>k max: go to Step IV.
Otherwise: Determine the orthogonal, regular triangular factorization of
$\bar{Z}:=\Lambda Z_{k+1}$:
$(Q_{k+1}^z, R_{k+1}^z):=\Phi^z(\bar{Z}, r_{k+1})$.
Go to Step I.

IV. Solution $x_{k+1}$ is determined. Stop!
End of algorithm of inverse kinematics.
Definition of the finction LLS:
$\lambda=LLS(r, m, g, Y, L)$.
$\lambda=0$, i=r+1, ..., m;
$\lambda_{nL}:=(\lambda_{r+1}, ..., \lambda_m)$;
$L^t \lambda_L = y^t g$.
From this, determine $\lambda_L \in \Re^r$ through reverse substitution. Define the output value of the function:
$\lambda:=(\lambda_L, \lambda_{nL})$.
With $1_{eq}:=1+\max_{l \leq i \leq m}|\lambda(i)|$, set the components of $\lambda$ that are among the secondary conditions of Equation (1) at the value $1_{eq}$. End of function LLS.

Definition of the function $\Phi_+$:

$(\bar{r}, \bar{m}, \bar{J}, \bar{Y}, \bar{Z}, \bar{L}, \bar{S})=\Phi_+^A(i0, r, m, J, Y, Z, L, S)$.
Activate secondary condition $j^{i0}$, The condition is applied that $\alpha_{j0}$ with j0: $=j^{i0}$ designate the $j^{i0}$-th line of A. Define $Q^t:=(Y, Z)$ and form $\bar{\alpha}:=Q\alpha_{j0}$. Partition $\bar{\alpha}:=(\bar{\alpha}_y, \bar{\alpha}_z)$ with $\bar{\alpha}_y \in \Re^r$ and $\bar{\alpha}_z \in \Re^{n-r}$. Determine the householder reflection $\tilde{H} \in \Re^{n-r, n-r}$ so that $|\bar{\alpha}_z|e_1=\tilde{H}\bar{\alpha}_z$, with $e_1:=(1, 0, ..., 0) \in \Re^{n-r}$. Define the unitary transformer: $H \in \Re^{n, n}$ according to:

$$H := \begin{pmatrix} I_r, & 0 \\ 0, & \tilde{H} \end{pmatrix}$$

Define the unitary transformer:
$\bar{Q}:=HQ$;
Update indices:

$$\bar{r} := \begin{cases} r & \text{if } |\bar{a}_z| = 0 \\ r+1 & \text{otherwise;} \end{cases}$$

$\overline{m}:=m+1$;
Exchange secondary conditions:
If $\bar{r} \neq r$, then $$\bar{j}^i := \begin{cases} j^0 & \text{if } i = \bar{r} \\ j^{\overline{m}} & \text{if } i = i0 \\ j^{\bar{r}} & \text{if } i = \overline{m}, \\ j^i & \text{otherwise} \end{cases}$$

otherwise $$\bar{j}^i := \begin{cases} j^0 & \text{if } i = \overline{m} \\ j^{\overline{m}} & \text{if } i = i0 \\ j^i & \text{otherwise;} \end{cases}$$

$\bar{J}:=(\bar{j}^1, \ldots, \bar{j}^{2n+6})$.

Update matrix factorizations.

$\overline{Y}$ is the partial matrix of $\overline{Q}^t$ that includes columns 1 through $\bar{r}$ of $Q\overline{Q}^t$.

$\overline{Z}$ is the partial matrix of $\overline{Q}^t$ that includes columns $\bar{r}+1$ through n of $\overline{Q}^t$.

$$\overline{L}:=\begin{pmatrix} L, & 0 \\ \bar{a}_y & |\bar{a}_z| \end{pmatrix};$$

$$\overline{S}:=\begin{cases} (S, \bar{a}_y) & \text{if } \bar{r} = r \\ S & \text{otherwise.} \end{cases}$$

End of the function $\Phi_+$.
Definition of the function $\Phi_-$:
$(\bar{r},\overline{m},\bar{J},\overline{Y},\overline{Z},\overline{L},\overline{S})=\Phi\_^A(i0,r,m,J,Y,Z,L,S)$.
Inactivate secondary condition $j^{i0}$.
If j0>r: (Eliminate singular, active secondary condition)
  Update indices:
  $\bar{r}:=r$;
  $\overline{m}:=m-1$;
  Exchange secondary conditions:

$$\bar{j}^i := \begin{cases} j^0 & \text{if } i = \overline{m}+1 \\ j^{\overline{m}+1} & \text{if } i = j0 \\ j^i & \text{otherwise} \end{cases}$$

$\bar{J}:=(\bar{j}^1, \ldots, \bar{j}^{2n+6})$.
Update matrix factorizations:
$\overline{Y}:=Y$;
$\overline{Z}:=Z$;
$\overline{L}:=L$;
$\overline{SL}:=(S_1, \ldots, S_{j0-r-1}, S_{j0-r+1}, S_{m-r})$,
where $S_i$ denote the columns of S.

If $j0 \leq r$: (Eliminate regular active secondary condition) $\tilde{R}$ results from $R:=L^t$ through striking of the j0-th column. The elements of $\tilde{R}$ that occur at the locations (j0,j0+1), (j0+1, j0+2), …, (r,r+1) are canceled through left manipulation with a sequence of unitary elimination matrices $\tilde{E}_{j0,j0+1}, \ldots, \tilde{E}_{r-1,r} \in \mathrm{IR}^{r,r}$. Define linear transformers:

$\hat{R}:=\tilde{E}_{r-1,r}\tilde{E}_{r-2,r-1} \cdots \tilde{E}_{j0,j0+1}\tilde{R}$;
$\hat{S}:=\tilde{E}_{r-1,r}\tilde{E}_{r-2,r-1} \cdots \tilde{E}_{j0,j0+1}S$;

$$E_{i,i+1}:=\begin{pmatrix} \tilde{E}_{i,i+1}, & 0 \\ 0 & I_{n-r} \end{pmatrix};$$

$Q^t:=(Y,Z)$;
$\overline{Q}:=E_{r-1,r}E_{r-2,r-1} \cdots E_{j0,j0+1}Q$;
If the last line of $\hat{S}$ is zero, or if r=m:
  Update indices:
  $\bar{r}:=r-1$;
  $\overline{m}:=m-1$;
  Exchange secondary conditions:

$$\bar{j}^i := \begin{cases} j^0 & \text{if } i = \overline{m}+1 \\ j^{i+1} & \text{if } i = j0, \ldots, \overline{m}. \\ j^i & \text{otherwise} \end{cases}$$

$\bar{J}:=(\bar{j}^1, \ldots, \bar{j}^{2n+6})$.
Update matrix factorizations:
$\overline{Y}$ is the partial matrix of $\overline{Q}^t$ that includes columns 1 through $\bar{r}$ of $\overline{Q}^t$.
$\overline{Z}$ is the partial matrix of $\overline{Q}^t$ that includes columns $\bar{r}+1$ through n of $\overline{Q}^t$.
If r<m, strike the last line of $\hat{S}$ and $\hat{R}$. Set:
$\overline{L}:=\hat{R}^t$
$\overline{S}:=\hat{S}$;
Otherwise (convert singular, active secondary condition into a regular, active secondary condition):
Determine the element of the last line of $\hat{S}$ with the smallest index l0 such that:
$\hat{S}_{r,i0} \neq 0$.
Exchange column l0 with column 1 of $\hat{S}$. Define linear transformer:
$\overline{R}:=(\hat{R}, \hat{S}_{l0})$,
where $\hat{S}_{l0}$ denotes the l0th column of $\hat{S}$.
Update indices:
$\bar{r}:=r$;
$\overline{m}:=m-1$;
Exchange secondary conditions:

$$\bar{j}^i := \begin{cases} j^0 & \text{if } i = \overline{m}+1 \\ j^{i+1} & \text{if } i = j0, \ldots, \overline{m}. \\ j^i & \text{otherwise} \end{cases}$$

$$\bar{j}^i := \begin{cases} \bar{j}^{\bar{r}+l0-1} & \text{if } i = \bar{r} \\ \bar{j}^{\bar{r}} & \text{if } i = \bar{r}+l0-1 \\ \bar{j}^i & \text{otherwise} \end{cases}$$

$\bar{J}:=(\bar{j}^1, \ldots, \bar{j}^{2n+6})$.
Update matrix factorizations:
$\overline{Y}$ is the partial matrix of $\overline{Q}^t$ that includes columns 1 through $\bar{r}$ of $\overline{Q}^t$.
$\overline{Z}$ is the partial matrix of $\overline{Q}^t$ that includes columns $\bar{r}+1$ through n of $\overline{Q}^t$.
$\overline{L}:L=\overline{R}^t$;
$\overline{S}:=(\hat{S}_2, \ldots, \hat{S}_{l0-1}, \hat{S}_1, \hat{S}_{l0+1}, \ldots, \hat{S}_{m-r})$,
where $\hat{S}_1$ denotes the columns of $\hat{S}$.

End of function $\Phi$.
Definition of the function $\Phi_0^A$:
$(\bar{r}, \bar{J}, \bar{Y}, \bar{Z}, \bar{L}, \bar{S}) = \Phi_0^A(\hat{A}, m, J)$.
1. Define:
$A^0 := \hat{A}$, $i := 0$.
2. Define the following matrix recursion:
$A^{i+1}L = H_i A^i$, $i \geq 0$.
The unitary transformer $H_i \in \mathfrak{R}^{n,n}$ is explained as follows:

$$H_i := \begin{pmatrix} I_i & 0 \\ 0, & \tilde{H}_i \end{pmatrix}.$$

The householder reflection $\tilde{H}_i \in \mathfrak{R}^{n-i,n-1}$ is defined such that:
$|\alpha_{k0}^i| e_1 = \tilde{H}_i \alpha_{k0}^i$,
with $e_1 := (1, 0, \ldots, 0) \in \mathfrak{R}^{n-i}$. Here the vectors $\alpha_k^i \in \mathfrak{R}^{n-i}$, $k = 1, \ldots, n-i$ indicate the columns of the matrix $\tilde{A}^i \in \mathfrak{R}^{n-i,m-1}$:

$$A^i := \begin{pmatrix} *, & * \\ *, & \tilde{A}^i \end{pmatrix}$$

Moreover, $1 \leq k0 \leq n-i$ is the smallest index with $\alpha_{k0}^i \neq 0$. If no such k0 exists, then go to step III; otherwise go to step IV.
3. Define indices:
$\bar{r} := i$;
$\bar{J} := (\bar{j}^i, \ldots, \bar{j}^{2n+6})$.
Define matrix factorizations:
$\bar{Q} := H_{\bar{r}-1} H_{\bar{r}-2} \ldots H_0$;
$\bar{Y}$ is the partial matrix of $\bar{Q}^t$ that includes columns 1 through $\bar{r}$ of $\bar{Q}^t$.
$\bar{Z}$ is the partial matrix of $\bar{Q}^t$ that includes columns $\bar{r}+1$ through n of $\bar{Q}^t$.
T is the matrix that results from the striking of lines +1 through n from $A^{i+1}$.
Define $\bar{L} \in \mathfrak{R}^{\bar{r},\bar{r}}$ and $\bar{S} \in \mathfrak{R}^{\bar{r},m-\bar{r}}$ according to:
$(\bar{L}^t, \bar{S}) := T$.
Stop: function $\Phi_0^A$ has been performed completely!
4. Exchange column i+k0 with column i+1 in $A^i$.

$$\bar{j}^k := \begin{cases} j^{i+k0} & \text{if } k = i+1 \\ j^{i+1} & \text{if } k = i+k0 \\ j^k & \text{otherwise} \end{cases}$$

Set $j^k := \bar{j}^k \forall k$, increase the counting index $i = i+1$ and go to Step II.
End of function $\Phi_0^A$.
Definition of the function $\Phi_0^Z$:
$(Q^z, R^z) := \Phi_0^z(\bar{Z}, r)$.
Determiine the QR triangular factorization of $\bar{Z}$:

$$Q^z \bar{Z} = \begin{pmatrix} R^z \\ 0 \end{pmatrix}.$$

Here $Q^z \in \mathfrak{R}^{n,n}$ designate a unitary matrix, and $R^z \in \mathfrak{R}^{r,r}$ an upper triangular matrix.
End of function $\Phi_0^z$.

What is claimed is:
1. A method of controlling a robot, in an environment of robotic physical motion limits, to move a point on the robot from a current first position vector $q_i$ to a second position vector $q_{i+1}$; wherein the robot has $n_{dof}$ robotic joint articulations or degrees of freedom and the method employs a kinematic equation based on use of a Jacobi Matrix J(q) having $n_{dof}$ columns;

the method comprising:

providing a calculating unit coupled to the robot:

inputting a control command to the calculating unit, the command further comprising a desired end-effect destination shift $\Delta x_d$, and calculating the second position vector $q_{i+1}$ from the inputted destination shift $\Delta x_d$ and the first position vector $q_i$;

wherein the step of calculating the second position vector $q_{i+1}$ further comprises:

(a) calculating a scalar energy criterion $$(q-q_i)^T \text{diag}(\Delta_j)(q-q_i)$$

wherein $\Delta_j$ are first non-negative weighting values and $j=1, \ldots n_{dof}$;

calculating a scalar reference-position deflection criterion $$(q-q_{ref})^T \text{diag}(\beta_j)(q-q_{ref})$$

wherein $\beta_j$ are second non-negative weighting values and $j=1, \ldots n_{dof}$ and $q_{ref}$ is an articulation reference position value that is predetermined such that a sequence of the position vectors $q_i$ runs near this reference position value;

calculating a scalar acceleration criterion $$(q-2q_i+q_{i-1})^{T\ \text{diag}(\gamma_j)}(q-2q_i+q_{i-1})$$

wherein $\gamma_j$ are third non-negative weighting values and $j=1, \ldots n_{dof}$;

calculating an additional criterion further comprising the negative of a scalar parameter p satisfying a kinematic equation $$p \cdot \Delta x_d = J(q_i)\ (q-q_i)$$

and an inequality $0 \leq p \leq 1$, whereby p is an attained fraction of the commanded end-effect destination shift $\Delta x_d$; and (b) summing the energy criterion, the reference-position criterion, the acceleration criterion, and the additional criterion to obtain a scalar quality function f(q);

(c) determining secondary conditions comprising the kinematic equation, the inequality $0 \leq p \leq 1$, physical path limitations $q_{min}$ and $q_{max}$, a maximum articulation speed $\dot{q}_{max}$, and a maximum articulation acceleration $\ddot{q}_{max}$;

(d) starting from the first position vector $q_i$, iteratively repeating optimization steps to obtain a series of intermediate position vectors, the optimization steps further comprising:

(d1) determining the active and inactive secondary conditions in the intermediate position vector;

(d2) taking a gradient of the quality function j(q) to obtain an optimization vector oriented in a descent direction of the quality function f(q);

(d3) projecting the optimization vector in a tangent space of active secondary conditions, whereby the optimization vector is orthogonal to a set of gradients of active secondary constraint conditions;

(d4) scaling a magnitude of the optimization vector according to a set of inactive secondary constraint conditions to obtain a scaled optimization vector;

(d5) obtaining a sum vector by adding the scaled optimization vector to the intermediate position vector; and (d6) evaluating the sum vector to determine if the sum vector lies generally at a minimum of the quality function; and (d7) if the sum vector does not lie generally at the minimum, then repeating the optimization steps starting from a new intermediate vector equal to the sum vector plus the preceding intermediate vector; and (e) if the sum vector lies generally at the minimum, then moving the point on the robot to the second position vector $q_{i+1}$.

2. The method according to claim 1 wherein, starting from a commanded end-effector destination shift $\Delta x_c := (\Delta x_t, \Delta x_r)$ at a time $T_i$, wherein and $\Delta x_t \in \Re^3$ and $\Delta x_r \in \Re^3$ each represent, respectively translational and rotational components of the commanded end-effector destination shift;

$\Delta x_t^{max}$ and $\Delta x_r^{max}$, respectively each define a maximum scalar-value Cartesian position offset of the end effector per sample time $\Delta T$, a desired Cartesian translational or rotational end-effector destination shift $\Delta x_t^d$ is given by:

$$\Delta x_t^d := \begin{cases} \Delta x_t & \text{if } |\Delta x_t| \leq \Delta x_t^{max} \\ \Delta x_t \dfrac{|\Delta x_t|}{\Delta x_t^{max}} & \text{otherwise} \end{cases}$$

$$\Delta x_r^d := \begin{cases} \Delta x_r & \text{if } |\Delta x_r| \leq \Delta x_r^{max} \\ \Delta x_r \dfrac{|\Delta x_r|}{\Delta x_r^{max}} & \text{otherwise,} \end{cases}$$

wherein quantity $|x|$ of a vector x is determined by a Euclidian norm $$|x| := \sqrt{\left(\sum_i x_i^2\right)},$$

and whereby the desired end-effector destination shift is given by $\Delta x_d := (\Delta x_t^d, \Delta x_r^d)$; and wherein the criteria, energy criteria, reference-position criteria, and acceleration criteria, are weighted according to prevalent problem-specific requirements by allocating three predetermined numerical values $\alpha_j, \beta_j, \gamma_j$, to each axis j, the value $\alpha_j$ serving in the weighting of an energy criterion that evaluates a difference between two adjacent, calculated articulation positions of axis j; and the value $\beta_j$ serving in weighting of a criterion that evaluates deflection of the predetermined articulation position $q_j$ from a reference value $q_{ref,j}$, and the value $\gamma_j$ serving in the weighting of a criterion which evaluates acceleration behavior in form of an articulation speed offset of the articulation axis $q_j$, which is predetermined by the operator as are the physical articulation stops $q_{min}, q_{max}$ of the manipulator, which relate to path limitations, and the articulation speed limitations $\dot{q}_{max}$ and the articulation acceleration limitations $\ddot{q}_{max}$, and wherein, upon an attainment of output value; an allowable optimum articulation position offset $\Delta q^i$ is calculated for a desired end-effector destination shift $\Delta x_d^i$ at the time $T_{i-1}$ during the time interval $\Delta T$, via an algorithm of inverse kinematics progressing during an initialization phase and a subsequent optimization phase, whereby a desired value is provided to articulation regulators from $q_{soll}^{i+1} := q_{soll}^i + \Delta q^i$ and the articulation regulators are correspondingly shifted with $q_{soll}^i$ during the time interval $\Delta T$, and wherein an allowable articulation position offset comprises the articulation position value being updated with $\Delta q$ to satisfy the physical articulation stops $q_{min}, q_{max}$ corresponding to $q_{min} \leq q_{soll} + \Delta q \leq q_{max}$ and wherein $\Delta q$ satisfies the articulation speed limitations $\dot{q}_{max}$ corresponding to $|\Delta q^i| \leq \dot{q}_{max} \Delta T$; and wherein the limitations of the articulation accelerations during an approach of articulation positions to the physical articulation stops are maintained reliably, and the type of optimum quality of $\Delta q^i$ os determined by an operator through the quality-criterion weighting $\alpha, \beta, \gamma$; and wherein the sampling time $\Delta T$ corresponding to $\Delta T \geq \max(\Delta t_q, \Delta t_r)$ is dimensioned such that the computation time $\Delta t_q$ for calculating an optimum allowable articulation position offset $\Delta q$ and the adjustment time $\Delta t_r$, which the regulators require for adapting the axial positions to the desired values $q_{soll}$ lies within the time span $\Delta T$.

3. The method according to claim 2, wherein the end-effector destination shift is Cartesian and is commanded at a time $T_i$ by an operator or a superordinate task in the form of a 6-dimensional increment vector.

4. The method according to claim 3, wherein the superordinate task comprises force control objectives.

5. The method according to claim 2, wherein the increment vector of the end-effector destination shift $\delta x_c$ is Cartesian and is commanded at a time $T_i$ determined by an operator or a superordinate task by evaluating the difference of absolute end effector coordinates.

6. The method according to claim 5, wherein the superordinate task comprises force control objectives.

7. The method according to claim 1, wherein an unknown obstacle comprises an inactive secondary constraint condition, and including a step of adding the inactive secondary constraint condition to the set of active secondary constraint conditions when the robot encounters the obstacle.

8. The method according to claim 1, wherein the active secondary conditions are those secondary conditions which are attained and the inactive secondary conditions are those secondary conditions which are not attained.

9. The method according to claim 1, including displaying the value of p to the operator, whereby the operator is warned of path limitations and singularities when the p value decreases.

10. The method according to claim 1, wherein the iteratively-repeated optimization steps include applying a method of Lagrange multipliers.

11. The method according to claim 1, wherein the current first position vector $q_i$ and a second position vector $q_{i+1}$ are joint position vectors.

12. The method according to claim 1, wherein the end-effect destination shifts $\Delta x_d$ are input to the calculating unit from at least one of a manual control device, a program, and a superordinate task.

13. The method according to claim 1, comprising use as a modular component of a superordinate task and wherein the end-effector destination shifts are commanded by the superordinate task.

14. The method according to claim 13, wherein the superordinate task comprises force control objectives.

15. An apparatus for controlling a robot, in an environment of robotic physical motion limits, to move a point on the robot from a current first position vector $q_i$ to a second position vector $q_{i+1}$; wherein the robot has $n_{dof}$ robotic joint articulations or degrees of freedom;

the apparatus comprising:

a computer including software and being coupled to the robot and to an input device for inputting a control command to the computer, the command further comprising a desired end-effect destination shift $\Delta x_d$, and wherein the software solves a kinematic equation based on use of a Jacobi Matrix $J(q)$ having $n_{dof}$ columns to perform a calculation the second position vector $q_{i+1}$ from the inputted destination shift $\Delta x_d$ and the first position vector $q_i$;

the calculation further comprising:

(a) calculating a scalar energy criterion $$(q-q_i)^T \text{diag}(\alpha_j)(q-q_i)$$

wherein $\alpha_j$ are first non-negative weighting values and $j=1, \ldots, n_{dof}$;

calculating a scalar reference-position deflection criterion $$(q-q\text{phf ref})^T \text{diag}(\beta_j)(q-q_{ref})$$

wherein $\beta_j$ are second non-negative weighting values and $j=1, \ldots, n_{dof}$ and $q_{ref}$ is an articulation reference position value that is predetermined such that a sequence of the position vectors $q_i$ runs near this reference position value;

calculating a scalar acceleration criterion $$(q-2q_i+q_{i-1})^T \text{diag}(\gamma_j)(q-2q_i+q_{i-1})$$

wherein $\gamma_j$ are third non-negative weighting values and $j=1, \ldots n_{dof}$;

calculating an additional criterion further comprising the negative of a scalar parameter $p$ satisfying a kinematic equation $$p \cdot \Delta x_d = J(q_i)(q-q_i)$$

and an inequality $0 \leq p \leq 1$, whereby $p$ is an attained fraction of the commanded end-effect destination shift $\Delta x_d$; and (b) summing the energy criterion, the reference-position criterion, the acceleration criterion, and the additional criterion to obtain a scalar quality function $f(q)$;

(c) determining secondary conditions comprising the kinematic equation, the inequality $0 \leq p \leq 1$, physical path limitations $q_{min}$ and $q_{max}$, a maximum articulation speed $\dot{q}_{max}$, and a maximum articulation acceleration $\ddot{q}_{max}$;

(d) starting from the first position vector $q_i$, iteratively repeating optimization steps to obtain a series of intermediate position vectors, the optimization steps further comprising:

(d1) determining the active and inactive secondary conditions in the intermediate position vector;

(d2) taking a gradient of the quality function $f(q)$ to obtain an optimization vector oriented in a descent direction of the quality function $f(q)$;

(d3) projecting the optimization vector in a tangent space of active secondary conditions, whereby the optimization vector is orthogonal to a set of gradients of active secondary constraint conditions;

(d4) scaling a magnitude of the optimization vector according to a set of inactive secondary constraint conditions to obtain a scaled optimization vector;

(d5) obtaining a sum vector by adding the scaled optimization vector to the intermediate position vector; and (d6) evaluating the sum vector to determine if the sum vector lies generally at a minimum of the quality function; and (d7) if the sum vector does not lie generally at the minimum, then repeating the optimization steps starting from a new intermediate vector equal to the sum vector plus the preceding intermediate vector; and (e) if the sum vector lies generally at the minimum, then outputting to the robot the second position vector $q_{i+1}$.

16. In a method of command control, by a programmer, for interactive path guidance of a kinematically-redundant manipulator based on end-effector destination shifts from the programmer, in connection with a calculation of articulated-position values according to an algorithm of inverse kinematics, the method including steps of:

providing a manual control device;

calculating a new articulation position $(q_{i+i})$ from an end-effector destination shift command from the control device and a current articulation position actual value $(q_i)$ of the manipulator;

the calculating step including as calculating factors a quality function $(f(q))$, which is parametrized by non-negative weighting values $(\alpha_j, \beta_j)$ and path limitations through physical articulation stops $(q_{min}, q_{max})$, a maximum articulation speed $(\dot{q}_{max})$, and a kinematic equation represented by the Jacobi Matrix;

calculating an energy criterion from $$(q-q_i)^t \text{diag}(\alpha_j)(q-q_i);$$

calculating a reference-position criterion from $$(q_{ref})^t \text{diag}(\beta_j) \cdot (q-q_{ref});$$

predetermining by the new articulation position new values for an articulation regulator, with the quality function being a sum of the energy criterion and the reference-position criterion;

determining a value $q_{ref}$ as a predetermined articulation-position value such that a sequence of calculated articulation-position values $(q_i)$ runs near a value of the reference-position criterion;

determining an allowable optimization vector, beginning with one of the articulation-position values $q_i$ as a starting point, on the basis of the quality function with respect to all active secondary conditions that indicate which path limitations have been attained;

scaling the allowable optinization vector according to inactive secondary conditions that indicate which path limitations have not been attained;

adding the scaled optimization vector to the articulation-position value calculated in the previous step of the iteration; and evaluating an optimum quality of the articulation-position values based on the quality function and the secondary conditions activated in the newly-calculated articulation position;

the improvement wherein:

the non-negative weighting values include a weighting value $\gamma_j$;

the calculating factors include a maximum articulation acceleration $(\ddot{q}_{max})$;

the calculating step includes calculating an acceleration criterion from $(-2q_i-q_{i-1})^t \text{diag}(\gamma_i)\cdot(q-2q_i-q_{i-1})$; and calculating an additional criterion further comprising the negative of a scalar parameter p satisfying a kinematic equation $$p\cdot\Delta x_d = J(q_i)(q-q_i)$$

and an inequality $0 \leq p \leq 1$, whereby p is an attained fraction of a commanded end-effector destination shift $\Delta x_d$.

* * * * *